United States Patent [19]

Petitjean

[11] Patent Number: 4,605,146
[45] Date of Patent: Aug. 12, 1986

[54] HYDROSTATIC FILM SUPPORT

[75] Inventor: Gilles Petitjean, Arlon, Belgium

[73] Assignee: E. I. Du Pont de Nemours and Company, Wilmington, Del.

[21] Appl. No.: 702,332

[22] Filed: Feb. 15, 1985

[51] Int. Cl.⁴ .................... F26B 13/20; F26B 13/10
[52] U.S. Cl. ................................. 226/97; 34/156
[58] Field of Search ............. 226/95, 97, 197, 196, 226/7; 34/155, 156, 232, 233, 188, 57 R, 57 A

[56] References Cited

U.S. PATENT DOCUMENTS

| | | | |
|---|---|---|---|
| 3,142,870 | 8/1964 | Nydam | 19/231 |
| 3,201,935 | 8/1965 | Smith et al. | 60/35.4 |
| 3,319,354 | 5/1967 | Hering, Jr. et al. | 34/155 |
| 3,498,515 | 3/1970 | Johnson | 226/97 |
| 3,678,599 | 7/1972 | Vits | 34/156 |
| 3,680,223 | 8/1972 | Vits | 34/156 |
| 3,763,571 | 10/1973 | Vits | 34/57 |
| 3,807,057 | 4/1974 | Noel | 34/237 |
| 4,043,495 | 8/1977 | Sander | 226/197 |
| 4,472,888 | 9/1984 | Spiller | 226/97 X |
| 4,492,328 | 1/1985 | Munnich et al. | 226/197 |

FOREIGN PATENT DOCUMENTS

| | | |
|---|---|---|
| 28152 | 3/1981 | Japan .................... 226/97 |
| 2029358 | 3/1980 | United Kingdom . |
| 2061230 | 5/1981 | United Kingdom ........ 226/97 |

Primary Examiner—Donald Watkins

[57] ABSTRACT

A device is disclosed for handling webs of material by hydrostatic support comprising (a) adjacent bearing bars, having arcuate, smooth surfaces, and being hole-free at lines of web proximity, (b) a pressure chamber between the bearing bars and open to the arcuate surfaces, and (c) fluid supply means to the pressure chamber.

10 Claims, 4 Drawing Figures

HYDROSTATIC FILM SUPPORT

BACKGROUND OF THE INVENTION

1. Field of the Invention

In many industrial operations involving the handling of webs, productivity is affected by the difficulty and expense of the handling, itself. Web materials must often be transported without being wrinkled and scratched. Web materials must often be flattened or held or wound at a certain predetermined tension. Web materials must often be treated by heat or by particular fluids. The device of this invention facilitates such web material handling.

2. Description of the Prior Art

U.S. Pat. No. 3,201,935, issued Aug. 24, 1965, discloses a device for determining the tension on a moving web of material. In use of that device, a web is moved over a single arcuate surface with holes at areas of web proximity. Pressure of a gas cushion between the arcuate surface and the web is known to equal the ratio of web tension to arcuate surface radius. The web tension can, therefore, be calculated by determination of the pressure.

United Kingdom Patent No. 2,029,358 published Mar. 19, 1980, discloses a web transport system wherein an air cushion is generated on an arcuate surface for the purpose of providing so-called contactless support of the web.

U.S. Pat. No. 3,807,057 issued Apr. 30, 1974, discloses a web supporting device with a pair of spaced tubular members, a fluid supply means outside the space between the members, and means for removing supporting fluid from between the members.

U.S. Pat. No. 3,678,599 issued July 25, 1972, discloses a web treating device wherein a pair of arcuate spaced-apart web support surfaces are fitted with holes at web proximate areas to withdraw web treatment gases supplied under pressure against a moving web from between the arcuate surfaces.

Pneumatic means for supporting and transporting webs are well known. Single nozzle devices have been made which can be used alone or in tandem or parallel with additional devices as disclosed in U.S. Pat. No. 3,763,571 issued Oct. 9, 1973. Similar single nozzle devices used in multiple series have been disclosed in U.S. Pat. No. 3,498,515 issued Mar. 3, 1970.

SUMMARY OF THE INVENTION

According to this invention there is provided a web handling device for supporting a moving web of material wherein the device has adjacent bearing bars with arcuate, smooth, surfaces which are holefree in the areas of web proximity during operation. Between the bearing bars there is a pressure chamber which is open toward the arcuate surfaces and there is a means for fluid supply to the pressure chamber. The arcuate surfaces are convex in substantially the same direction and away from the pressure chamber and segments of the arcuate surfaces have radii which are located on the same side of the supported web, in operation. The bearing bars can be cylindrical and the cylinders can be rotatable and parallel.

DESCRIPTION OF PREFERRED EMBODIMENTS

The device of this invention is useful in handling webs of a variety of sizes and materials and for a variety of operations. The web handler of this invention can be used with webs of paper or textiles or of film material such as cellophane or thermoplastics or the like. There appears to be no limit to the width of web which can be used;—the web handling device, for example, being directly substitutable for presently-used web transfer roller devices for simple transfer applications.

The device of this invention is useful for assuring that a web of thin material, such as a thermoplastic film, is completely flat and wrinkle-free immediately prior to winding the film onto a roll or subjecting the film to a further operation or treatment. The device is also useful in the area of web tension adjustment and equalization. Because the web being handled is supported away from the surfaces of the device of this invention by fluid forces, a variation of tensions on the web can be absorbed by means of this device. Such variation of tensions can be caused by eccentricities in transport rolls, changes in drive roll speeds, and the like.

Figure 1:
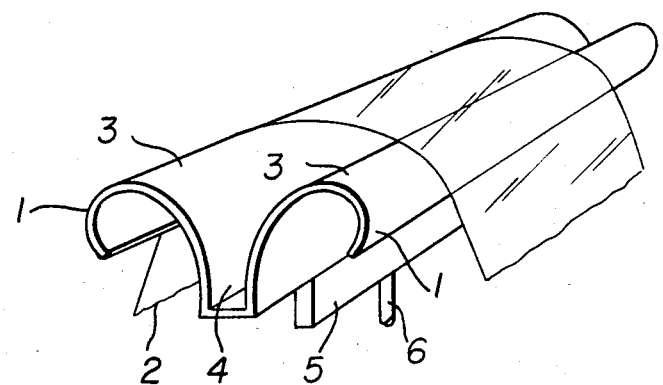
FIG. 1 is a representation, in perspective, of the web handling device of this invention.

Looking to FIG. 1, a device of this invention is shown, in perspective. Bearing bars 1 extend, in substantially parallel, spaced-apart relation, beyond the width of web 2 being moved across the bars. Bearing bars 1 have arcuate, smooth, surfaces 3. The space between bearing bars 1 serves as a pressure chamber 4 and a fluid supply 5 serves as a distributor for fluid under pressure from supply tube 6 to pressure chamber 4.

Figure 2:
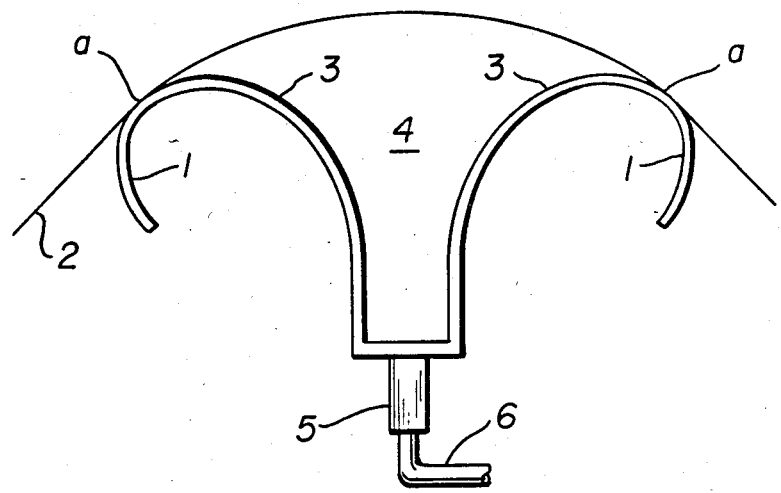
FIG. 2 is a cross-sectional view of the device of FIG. 1.

FIG. 2, which represents a cross section of the device of FIG. 1, shows the bearing bars 1 with arcuate surfaces 3 and the relationship of those surfaces 3 with web 2. Arcuate surfaces 3 are convex away from pressure chamber 4 and are holefree at lines of closest web proximity during operation (a). Lines (a) along the length of bearing bars 1 actually include the area where the web and the surface would come into contact if the web were under tension but not supported. Fluid under pressure is provided by tube 6 to fluid supply 5 for pressure chamber 4. Fluid is required in a volume and at a force which is adequate to generate a pressure in pressure chamber 4 to support web 2 as the web is moved across bearing bars 1. Fluid requirements will vary, of course, with several factors such as the length of bearing bars 1, the spaces existing between the edge of web 2 and the end of bearing bars 1, the means used, if any, for sealing or blocking the ends of pressure chamber 4, the space required or desired between the web 2 and the arcuate surface 3 of bars 1, in operation, the temperature and viscosity of the fluid, the kind of fluid, and the like.

The pressure chamber 4 can be blocked at the ends, if desired, and such blocking will reduce fluid requirements. It has been found that the web handling device will be more effective in web flattening and wrinkle removing if the ends are not blocked or not blocked completely.

The fluid can be liquid or gas, is usually gas, and is most often air. Of course, the fluid can be a liquid such as water or an organic carrier or solvent for some web treatment material. The fluid can be used as a heat transfer medium to heat or cool the web either as a liquid or as a gas.

The web 2 can be introduced to the film handling device or taken away from the device at any angle so long as the film contacts or is proximate to only the arcuate surfaces 3 of the bearing bars 1. Also, the angle of web introduction can be different from the angle of web take away. Bearing bars 1 are usually parallel with one another but need not be so. When the bars 1 are not parallel, the angles of web introduction and take away may vary along the width of the web.

So long as arcuate, smooth, holefree surfaces 3 are provided on each bearing bar 1, there is no need for both of a pair of bars 1 to have the same radius or even to be circular. The surfaces 3 must, however, be holefree in active areas to avoid fluid flow upsets caused by localized pressure variations. Holes in active areas of the arcuate surfaces 3 can cause web flutter due to high or low pressure at the hole and can cause diminished control of the web and supporting fluid movement.

The so-called active areas of arcuate surfaces 3 are the areas which are near to a web during operation of the web handling device. The active areas of the arcuate surfaces 3 can be more particularly defined by simple geometric analysis. The active areas 3, that is, the areas which are holefree for operation of the invention herein, can be defined as the areas extending from lines formed on each arcuate surface by tangential contact with a flat plane covering both of the arcuate surfaces in a web handling device to lines formed on each arcuate surface by tangential contact with flat planes intersecting the covering plane at right angles.

Bearing bars 1 are adjacent and spaced apart a distance appropriate to accomplish the desired objective. For example, to flatten and unwrinkle a film web, the arcuate surfaces 3 should be spaced from about 1 to about 10 centimeters apart. The spacing most often used is the sum of the radii of each of the bearing bars 1. To heat or cool or treat the surface of a web, the spacing of the bearing bars can be increased to accomodate increased contact times which might be required.

The fluid pressure necessary to operate the device of this invention decreases with an increase in spacing between the bearing bars. The fluid pressure required to support a web in this device is equal to the tension on the web divided by the radius made by the web as it is supported between lines (a):

$$P = T/R$$

wherein P is the pressure of the fluid supporting the web; T is the tension exerted on the web; and R is the radius of the circular segment formed by the supported web. As the spacing between bearing bars increases, the radius of a supported web naturally increases and, for the same tension, the required supporting pressure decreases inversely.

Contact between the web and the active areas of each of the two arcuate surfaces 3 is prevented, in operation, by the formation of a boundary fluid layer the thickness of which depends on the web speed, the web tension, the curvatures of surfaces 3 and the viscosity of the fluid in the convergent gap which is defined, on one side, by the web and on the other side by the arcuate surfaces 3.

The arcuate surfaces should be smooth and, in any event, any roughnesses should be lower than the thickness of the boundary fluid layer to achieve scratch-free operation.

In case of operation at low speed or at high web tension, it may be necessary to have both bearing bars 3 cylindrical and rotatable in the direction of the web travel to increase the thickness of the boundary fluid layer where the film is in close proximity to the bearing bar surfaces and to reduce the relative velocity difference between the web and the bearing bars. Such an arrangement is represented at FIG. 4.

Figure 3:
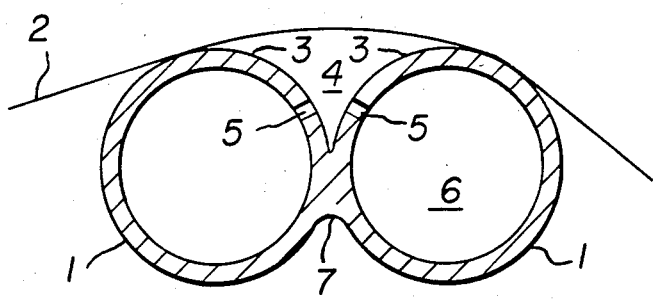
FIG. 3 is a cross-sectional view of a web handling device of this invention constructed from cylinders.

FIG. 3, is a cross-sectional representation of a web handling device of this invention wherein bearing bars 1 are cylindrical. The bearing bars are joined at a weld 7 and the pressure chamber 4 is defined by the arcuate surfaces 3 of the bars from weld 7 through the shorter distance to the line of web proximity in operation. Fluid supply 5 is formed by holes in the wall of at least one of the bearing bars 1; and fluid is delivered to fluid supply 5 by utilizing the interior of the bearing bars 1 as a plenum for the fluid. Fluid supply 5 can, also, be grooves or slots in the wall of at least one of the bearing bars 1 such that fluid is provided in nozzle-style as a continuum along the bar 1.

Figure 4:
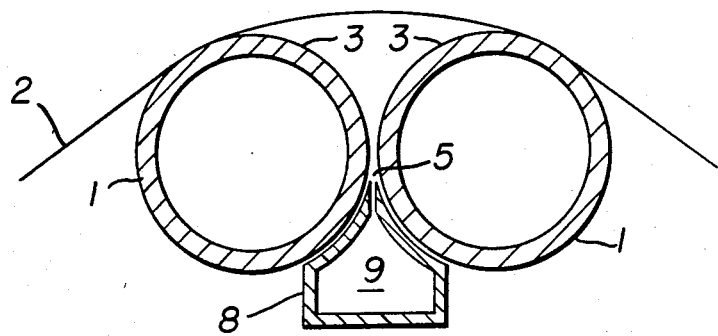
FIG. 4 is a cross-sectional view of a web handling device of this invention constructed from rotatable cylinders.

FIG. 4, is a cross-sectional representation of a web handling device of this invention wherein bearing bars 1 are cylindrical and the surfaces are entirely holefeee. Fluid supply 5 is by holes or a nozzle in plenum 8 shaped to fit closely to the contour of bearing bars 1 and used to direct fluid from plenum cavity 9 through fluid supply 5 into pressure chamber 4. Bearing bars 1 can be fixedly mounted or, because they are cylindrical and entirely holefree, can be rotatably mounted. In operation rotatably mounted bearing bars provide reduced relative motion, with moving webs; and such reduced relative motion reduces, even further, any effects of incidental contact between the web and the bearing bars 1.

I claim:

1. A web handling device for providing hydrostatic support to a moving web of material comprising
    (a) adjacent bearing bars, across which the supported web moves, in operation, having (i) arcuate, smooth, surfaces and being (ii) holefree at lines of web proximity, in operation,
    (b) a pressure chamber between the bearing bars and open toward the arcuate surfaces,
    (c) fluid supply means to the pressure chamber.

2. The web handling device of claim 1 wherein all segments of the arcuate surfaces have radii which are located on the same side of the supported web, in operation.

3. The web handling device of claim 1 wherein the bearing bars are cylindrical.

4. The web handling device of claim 3 wherein the cylindrical bars are rotatable.

5. The web handling device of claim 1 wherein the bearing bars are substantially parallel.

6. A web handling device for providing hydrostatic support to a moving web of material comprising
    (a) adjacent bearing bars,
    (b) a pressure chamber between the bearing bars, and
    (c) fluid supply means to the pressure chamber
    wherein the bearing bars have arcuate, smooth, surfaces which are holefree over an area extending from lines formed on each surface by tangential contact with a flat plane covering both of the surfaces to lines formed on each surface by tangential contact with flat planes intersecting the covering plane at right angles.

7. The web handling device of claim 6 wherein the arcuate surfaces are convex from the pressure chamber.

8. The web handling device of claim 6 wherein the bearing bars are cylindrical and the arcuate surfaces are entirely holefree.

9. The web handling device of claim 8 wherein the cylindrical bars are rotatable.

10. The web handling device of claim 6 wherein the bearing bars are substantially parallel.

* * * * *